Nov. 14, 1939.  R. B. CRIDDLE  2,179,573
RETRACTABLE TOOL AND HOLDER THEREFOR
Filed Oct. 10, 1936
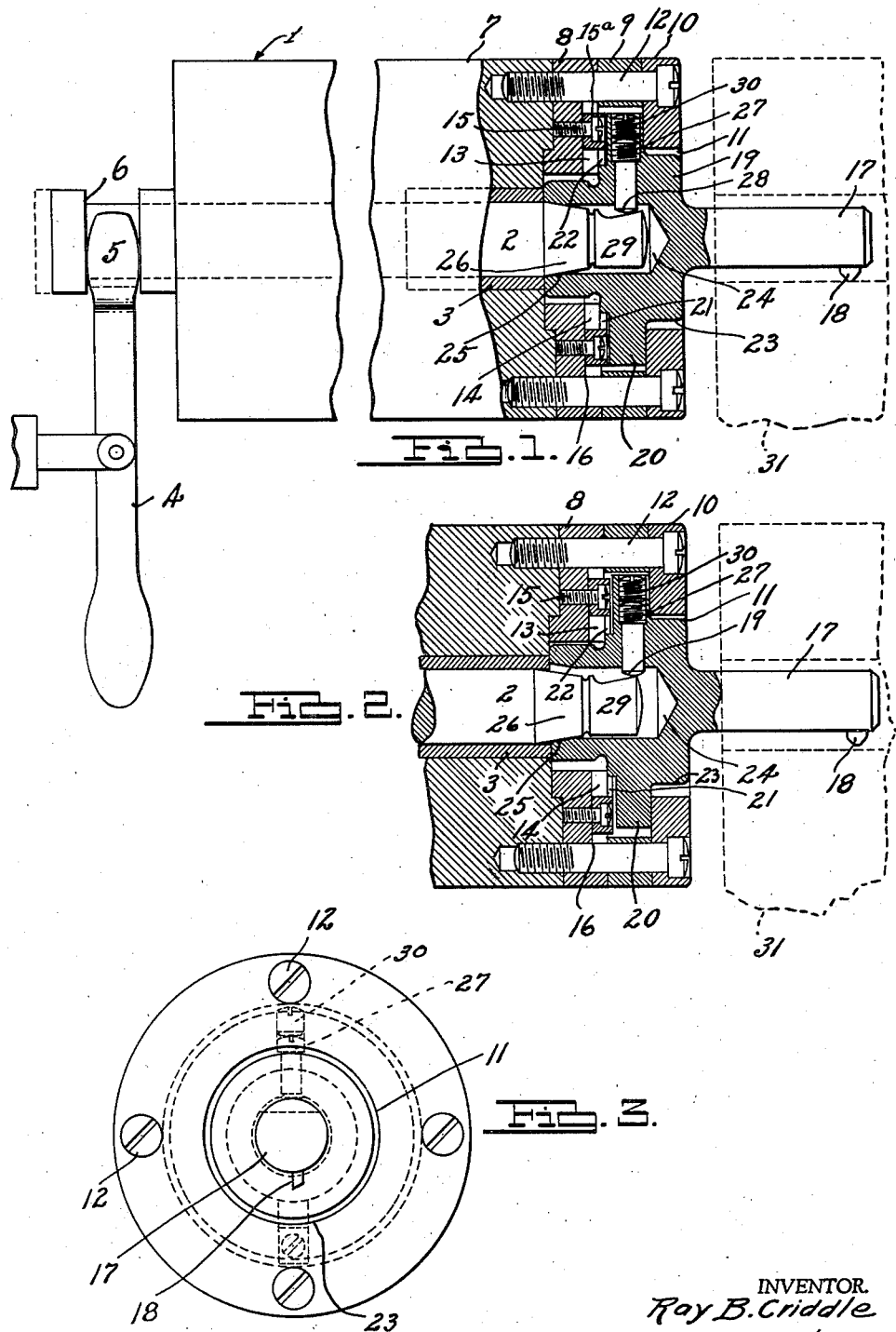
INVENTOR.
Ray B. Criddle
BY
ATTORNEY.

Patented Nov. 14, 1939

2,179,573

UNITED STATES PATENT OFFICE 2,179,573

RETRACTABLE TOOL AND HOLDER THEREFOR

Ray B. Criddle, Detroit, Mich., assignor to Ex-Cell-O Corporation, Detroit, Mich., a corporation of Michigan Application October 10, 1936, Serial No. 105,069

9 Claims. (Cl. 77—3)

This invention relates to a retractable tool and holder therefor, and the object of the invention is to provide a boring tool having a radial cutter and a holder including a draw bar for moving the holder laterally of the axes of an aperture being rebored whereby the tool is centered in proper cutting relationship with a wall of the aperture as the tool is introduced thereinto and is shifted to position with the cutter out of contact with the machined surface in the withdrawal of the tool.

Heretofore, tools having radial cutters, upon withdrawal from the aperture, score the finished surface, and a feature and object of this invention resides in the means employed for moving the tool to a position out of contact with the bored surface during the retracting movement.

It is further an object and feature of this invention to provide a boring tool and holder in conjunction with a draw bar functioning to first automatically center the tool for the boring operation on movement of the tool into the aperture being bored or rebored and to first automatically move the tool off center in respect to the bored aperture prior to withdrawal of the tool thus permitting the tool to be withdrawn with the cutter out of contact with the machined surface.

A further feature of the invention resides specifically in the provision of a floating tool carried by the spindle of a boring machine for moving the assembled tool and head toward and from the work and a draw bar having means cooperating with means on the tool to cause the tool to center in respect to the aperture in the cutting stroke and to automatically move it off center on the idle stroke of the spindle.

These and other objects and novel features of the invention are hereinafter more fully described and claimed, and the preferred form of construction of a retractable boring tool and holder embodying my invention is shown in the accompanying drawing in which—

Fig. 1 is an elevation partly in section showing a boring tool, driving spindle and draw bar therefor, the tool being shown in the cutting operation.

Fig. 2 is a fragmentary view partly in section showing the position of the tool and parts during the withdrawal or idle stroke of the tool.

Fig. 3 is an end view of the tool and its holder.

Boring tools are usually used with machines having a driven spindle shown at 1, the spindle having a central aperture for a draw bar 2 and a bearing 3 therefor. Inasmuch as the invention resides in the tool and its holder in conjunction with the draw bar, I have not illustrated any parts of the boring machine for operating the spindle and have only shown a manual means for moving the draw bar 2. This means may consist of a pivoted lever 4 having yoke end 5 riding in a collar 6 on the end of the draw bar.

The usual mechanism heretofore in use for moving the spindle of boring machines is so constructed as to provide the necessary movement of the spindle and tool in a direction toward or from the work and may be used in conjunction with my improved tool and holder.

At the forward end of the spindle is a holder indicated generally at 7 which consists of a base element 8 of cylindrical form, an intermediate ring-like member 9 and a cap plate 10 having a central aperture 11. These three elements of the holder are associated in the manner indicated generally in the drawing and are retained in place on the end of the spindle 1 by a number of cap screws 12. On the base 8 are two oppositely disposed grooves 13 and 14 and screws 15 and 16 extend through keys 15ª and are threaded in the base 8 as shown in Fig. 1. The tool 17 has a radial cutter 18 as indicated and is provided with a base 19 which has a flanged part 20 extending to between and in contact with the opposed faces of the cap 10 and base 8 and the inner face of the flange has radial grooves at 21 and at 22 in which grooves the heads of the screws 15 and 16 lie. These keys 15ª, through rotation of the spindle, cause the tool to be rotated and permit the tool to float in respect to the holder 7. The flange 20 is somewhat less in diameter than the inner diameter of the ring 9 and the aperture 11 of the cap plate 10 is somewhat greater than the diameter of the shouldered portion 23 of the tool base. Thus there is a possible lateral movement of the tool base in respect to the holder element indicated generally at 7.

The feature of this invention is in the provision of means for centering the tool in respect to the spindle for a cutting operation and to cause a lateral movement of the tool to position the cutter out of contact with the surface of the aperture in the work during the withdrawal of the tool. For this purpose the rear end of the tool base or quill 19 is provided with a recess 24 with its axis coinciding with the tool axis. The recess 24 opens through the rear end of the quill at which point it is provided with a coned entrance portion 25. The draw bar 2, as before stated, is longitudinally movable in respect to the tool, and has a coned surface 26 which fits the coned portion 25 of the recess 24 when the draw bar is moved forward as the tool is moved on its cutting stroke. Thus, movement of the draw bar to the right in the relationship of the parts shown will center the tool by reason of the coned portion 26 seating in the coned end 25 of the recess 24.

To effect lateral movement of the tool by withdrawal of the draw bar, I have preferably provided a headless screw 27 in the character of construction here shown which is introduced in a radial and threaded aperture formed in the flange 20 of the tool base 19. This screw has a terminal end 28 and the draw bar has a cam face 29 against which the end 28 of the screw may engage. I also provide a lock screw 30 for retaining the screw 27 in its adjusted position.

In the position of the parts shown in Fig. 1, the tool 17 is centered in respect to the aperture being rebored in the work indicated by the dotted lines 31. At the finish of the boring stroke the tool requires to be withdrawn from the aperture and this is produced through the usual mechanism for moving the spindle, not here shown. Prior to moving the spindle to the left, the lever 4 is actuated to move the draw bar 2 to the left from the position shown in Fig. 1, and this movement causes the cam 29 to ride under the face of the screw 28. There is a little latitude of movement, or lost motion, of the draw bar permitted in order that it may first withdraw the coned portion 26 of the draw bar from engagement with the coned end 25 of the recess 24. This requires but a very slight movement and thereupon, further movement will cause the tool to be raised from the position shown in Fig. 1 to the position indicated generally in Fig. 2. This causes a lateral movement of the tool and quill and raises the cutter 18 from contact with the surface cut by the tool on its work stroke. Movement of the spindle to the left will then withdraw the tool from the aperture without possibility of the cutter 18 scoring the cut surface. It will be realized that the screw 27 may be set to provide for the desired clearance between the coned portions 26 and 25 prior to the producing of the lateral movement of the tool.

It will be seen therefore that the draw bar functions to center the tool as the tool is brought to operative relation with the work and to move the cutter off center in relation to the bored or rebored aperture on the withdrawal stroke and that the parts function automatically once the parts are assembled in the proper relationship freeing the operator from necessity of adjusting or readjusting the tool prior or subsequent to the cutting operation of the tool. The relationship of the parts is such that, in initiating the cutting movement of the spindle and tool or in initiating the withdrawal movement of the tool the axis of the tool is either first centered or first offset in respect to the spindle axis before the tool and spindle are moved longitudinally in either direction.

The previously described structure involves the movement of the spindle to carry the tool forward or from the work but in many structures the work is moved toward or from the tool. My improved tool and holder and related draw bar structure may function with machines of either type, and it is to be understood that wherein the claims involve the term relative movement of the tool and the work, I have intended to mean either a structure wherein the spindle moves the tool to the work or the work is moved to the tool.

From the foregoing description, it is believed evident that the tool is of a comparatively simple and inexpensive construction that may be assembled and then secured to the end of a spindle, and that the various objects and features of the invention are attained by the construction described, it being pointed out that various changes may be made in the parts without departing from the spirit and scope of the invention as set forth in the appended claims.

Having thus fully described my invention, its utility and mode of operation, what I claim and desire to secure by Letters Patent of the United States is—

1. A retractable tool and holder therefor for use in a boring machine having a spindle, a draw bar reciprocable on the longitudinal axis of the spindle, said tool comprising a housing attached to the spindle end and provided with a circular recess therewithin, the tool having a base formed with a flange engaging the side walls of the recess and being of less diameter than the recess whereby the tool is held from relative movement in a direction longitudinally of the spindle axis and a lateral movement of the tool is permitted, key means between the housing and the tool base permitting the said base to move laterally and causing rotation of the tool by the spindle, said tool base having a recess and the said draw bar having an end insertible in the recess, said recess having a coned face at the end thereof through which the draw bar extends and the draw bar having a coned surface for engagement therewith whereby, on movement of the draw bar toward the tool, the coned surfaces are brought to engagement and the tool is centered, and a cam means on the draw bar engaging a part extending into the recess of the tool base whereby, on movement of the draw bar to separate the said coned surfaces, the cam means effects lateral movement of the tool to offset the tool axis in respect to the axis of the spindle and draw bar.

2. A retractable tool and holder therefor for use in a boring machine having a reciprocable spindle, a draw bar reciprocable on the longitudinal axis of the spindle, a housing attached to the spindle and having a central opening and an intermediate circular recess providing spaced parallel walls, a tool having a radial cutter and a base provided with a flange engaging the said parallel walls of the recess and being of less diameter than the recess whereby the tool is held from movement in a direction longitudinally of the spindle axis and a lateral movement of the tool is permitted, key means between the housing and the tool base permitting said lateral movement of the tool base causing rotation of the tool by the spindle, said tool base having a recess on the axis of the tool and the draw bar having an end insertible in the recess, said recess having a coned face at the open end and the draw bar having a coned surface a distance from its end for engagement therewith whereby, on movement of the draw bar toward the work, the coned surfaces are first brought to engagement to thereby center the tool prior to movement of the tool on the cutting stroke, and cam means on the draw bar between the coned surface and the end thereof and an adjustable part associated with the tool base and engageable thereby whereby, on movement of the draw bar in a direction away from the tool, the said cam means first engages the said adjustable part and effects lateral movement of the tool to offset the tool axis in respect to the spindle axis and draw bar prior to movement of the spindle and tool on the idle stroke, said adjustable part providing for a limited movement of the draw bar to separate the coned surfaces prior to the said cam means effecting lateral movement of the tool.

3. In combination, a tool holder having first and second spaced cam surfaces, a spindle for rotatively driving said holder, and an adjusting member connected between said holder and spindle and having corresponding first and second spaced cam surfaces selectively engageable with said holder surfaces, and means for moving said member relative to and axially of said spindle and holder to selectively move said member and holder surfaces into and out of engaging relation, said adjusting member cooperating with said holder through said surfaces respectively, to positively lock said holder in either of two spaced limit positions laterally relative to said spindle.

4. In combination, a rotable spindle having an axial bore therein; a tool holder having first and second cam surfaces formed thereon; means securing the tool holder to the spindle so as to provide a rotative driving connection therebetween while permitting movement of the holder radially of the spindle; and an adjusting member movable within said bore and effective to cooperate with said cam surfaces so that in moving the adjusting member into one position, it engages one of the cam surfaces to shift the tool holder radially and lock it in the position to which it is shifted and in moving the adjusting member to another position, it engages the other cam surface to shift the holder radially and lock it in the second position to which it is shifted.

5. In combination, a rotatable spindle having an axial bore therein; a tool holder adapted to be secured to the end of the spindle for rotation therewith and having a coned surface presented to said end and a cam surface thereon; means securing the tool holder to the spindle so as to form a rotative driving connection therewith while permitting movement of the tool holder radially of the spindle; and an adjusting member in said bore having a coned portion concentric with the spindle axis for cooperation with the coned surface of said tool holder and a cam portion spaced from the coned portion for cooperation with the cam surface of said tool holder, said adjusting member being reciprocable along the axis of the spindle bore so as to bring the coned portion into engagement with the coned surface and center the tool on the spindle and to bring the cam portion into engagement with the cam surface and hold the tool holder in radially offset position relative to the holder.

6. In combination, a rotatable spindle having an axial bore therein; a tool holder having first and second cam surfaces formed thereon, one of said cam surfaces being formed by a member adjustably threadably received in said tool holder; means securing the tool holder to the spindle so as to provide a rotative driving connection therebetween while permitting movement of the holder radially of the spindle; and an adjusting member movable within said bore and having cam surfaces for cooperation with said first mentioned cam surfaces so as to move said tool holder between first and second positions radially of the spindle.

7. In combination, a rotary spindle having spaced radial surfaces at one end, a tool holder having surfaces substantially fitting the first surfaces respectively and which is radially movable thereover, means locking the holder to the spindle for rotation therewith, said holder having an opening at its center and axially spaced cam surfaces in said opening, a member shiftable axially of the spindle and having an end portion projecting into said opening and provided with axially separated cam surfaces, one of the cam surfaces on the member being adapted to engage one of the cam surfaces in the opening when the member is shifted axially in one direction so as to shift the holder radially in one direction and the other cam surface on the member being adapted to engage the other cam surface in the opening when the member is shifted in the other direction, so as to shift the holder radially in another direction, the arrangement being such that when the member is so shifted the holder is shifted into a positive location and forced into rigid engagement with one radial surface or the other depending on direction of shifting of the member.

8. In combination, a rotary spindle having an axial bore therein and spaced radial surfaces at one end, a tool holder having surfaces substantially fitting the first surfaces respectively and which is radially movable thereover, means locking the holder to the spindle for rotation therewith, a relatively small shank projecting from the axially outer side of the holder substantially at its center and in a direction generally axial of the spindle, a tool on the shank, said holder having a substantially central, axially extending opening which opens to the axially inner side thereof, a member shiftable axially in the spindle bore and having an end portion projecting into the opening in the holder, and means on said end portion of the member and in said opening for effecting radial shifting of the holder when the member is axially shifted, the arrangement being such that when the member is shifted axially in one direction, the holder is shifted radially in one direction and into a positive location with the holder rigidly held against one radial surface on the spindle and when the member is shifted axially in the other direction, the holder is shifted radially in another direction and into a second positive location with the holder rigidly held against the other radial surface on the spindle.

9. In combination, a rotary spindle having spaced radial surfaces at one end, a tool holder having surfaces substantially fitting the first surfaces respectively and which is radially movable thereover, means locking the holder to the spindle for rotation therewith, said holder having an opening at its center and axially spaced cam surfaces in said opening, a member shiftable axially of the spindle and having an end portion projecting into said opening and provided with axially separated cam surfaces, one of the cam surfaces on the member being adapted to engage one of the cam surfaces in the opening when the member is shifted axially in one direction so as to shift the holder radially in one direction and the other cam surface on the member being adapted to engage the other cam surface in the opening when the member is shifted in the other direction, so as to shift the holder radially in another direction, the arrangement being such that when the member is so shifted the holder is shifted into a positive location and forced into rigid engagement with one radial surface or the other depending on direction of shifting of the member, one of the cam surfaces in the opening in the holder being formed by a member adjustably threaded in the holder and having a cam portion projecting into the opening.

RAY B. CRIDDLE.